UNITED STATES PATENT OFFICE 2,488,204

AZO DYESTUFFS AND METHOD FOR DYEING CELLULOSE ACETATE

Georges Kopp, Mont Saint-Aignan, and René Eugène Marcel Gangneux, Rouen, France, assignors to Manufactures de Produits Chimiques du Nord Etablissements Kuhlmann, Paris, France, a corporation of France No Drawing. Application April 26, 1945, Serial No. 590,503. In France December 31, 1941

Section 1, Public Law 690, August 8, 1946
Patent expires December 31, 1961

2 Claims. (Cl. 8—48)

This invention relates to azo dyestuffs for dyeing rayon silks basically composed of cellulosic esters or ethers or of like plastic materials.

We have found that azo dyestuffs of the general formula:

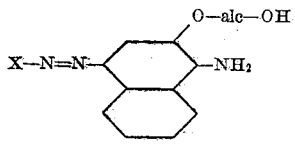

in which X represents the radical of an aromatic amine carrying no group $SO_3H$ or COOH and "alc" represents an alkyl radical, are very useful for dyeing rayon silks basically composed of cellulosic esters or ethers or of like plastic materials.

The said dyestuffs, which form new commercial products, can be obtained by diazotisation of an aromatic amine or of an amine behaving like an aromatic amine when diazotised, these amines carrying nor $SO_3H$ neither COOH groups but carrying eventually substituents such as halogen atoms or alkyl, alkoxy, hydroxy-alkoxy, nitro, nitrilo, sulphamido, acylamino, non-diazotisable amino, sulphone or other similar groups, and by coupling of the so obtained diazo derivative with a 2-oxy-alkoxy-1-naphthylamine, this operation being eventually followed by a reduction when the diazotisable amine carries a $NO_2$ group or by a saponification when it carries an acylamino group.

Thus are obtained monoazo dyestuffs which show a good affinity to rayon silks basically composed of cellulosic esters or ethers or of other plastic materials such as polyvinylic resins and superpolyamides. They dye the said fibres in shades going from orange to blue; the so obtained dyeings can be diazotised, and developed by means of any coupling agents such as phenols, polyphenols, pyrazolones, naphthols, aromatic amines, beta-oxynaphthoic acid and the like. The shades resulting from this treatment are violet, blue, black, greenish black, olive, green and brown ones which are very fast to washing, sulphur, chlorine, overdyeing and to light.

The following are nonlimitative examples illustrating our invention.

Example 1

93 parts of aniline are diazotised by means of 250 parts of hydrochloric acid of 19° Bé., 2,500 parts of icy water and 140 parts of a 50% solution of sodium nitrite. The so obtained diazo is rapidly poured into the solution obtained by dissolving 187 parts of 1-amino-2-hydroxy-ethoxynaphthalene in 10,000 parts of icy water by means of 100 parts of hydrochloric acid of 19° Bé.; the mineral acidity is neutralized by means of sodium acetate in proportion with the coupling.

The dyestuff when separated in the usual manner dyes acetate rayon silks in very bright orange.

When diazotised and developed by means of 2-hydroxy-3-naphthoic acid it gives a bluish green which is fast to light.

Example 2

The aniline of Example 1 is substituted by 138 parts of paranitraniline. The so obtained dyestuff dyes acetate rayon silks in reddish violet which, after diazotisation and development by means of 2-hydroxy-3-naphthoic acid gives a bluish green of good fastness.

Example 3

The aniline of Example 1 is substituted by 262 parts of 6-bromo-2-4-dinitraniline. The so obtained dyestuff dyes acetate rayon silks in a very bright bluish green of good fastness and stable to artificial light. When diazotised and developed by means of 2-hydroxy-3-naphthoic acid it gives a yellowish green of good fastness.

Example 4

184.5 parts of 3-chloro-4-amino-acetanilide are impasted in 250 parts of hydrochloric acid of 19° Bé. and 2,000 parts of water; one cools with ice to 0° and diazotises by means of 140 parts of a 50% solution of sodium nitrite; the so obtained diazo is poured into a solution of 1-amino-2-oxyethoxynaphthalene identical with that of the foregoing examples. The coupling is finished after a few hours. The dyestuff separated by filtration is dissolved in 2,500 parts of water, 500 parts of alcohol and 400 parts of caustic soda of 35° Bé.; one heats during one hour up to ebullition. After this time the de-acetylation is finished; the solution is allowed to cool and then filtered.

The so obtained dyestuff dyes acetate rayon silks in bright scarlet which, when diazotised and developed with 2-hydroxy-3-naphthoic acid gives a brown black of excellent fastness to light.

The same dyestuff can be obtained by copulation of the diazo of the 2-chloro-4-nitraniline with 1-amino-2-oxyethoxynaphthalene with following reduction by the sulphide of the so obtained dyestuff.

Example 5

The 5-chloro-4-amino-acetanilide of Example 4 is substituted by 195 parts of 3-nitro-4-amino-acetanilide. The dyestuff obtained after saponification of the acetyl function dyes acetate rayon silks in Bordeaux red which when diazotised and developed with 2-hydroxy-3-naphthoic acid gives a pure brown of good fastness.

Example 6

The 6-bromo-2-4-dinitraniline of Example 3 is substituted by 153 parts of nitroparaphenylene-diamine. The so obtained dyestuff dyes acetate rayon silks in scarlet. When diazotised and developed with 2-hydroxy-3-naphthoic acid it gives a yellow green of good general fastnesses.

Example 7

181 parts of 3-nitro-4-dimethylparaphenylene-diamine are dissolved in 4,000 parts of water by means of 350 parts of hydrochloric acid of 19° Bé.; one cools with ice to 0° and diazotises by means of 140 parts of a 50% solution of sodium nitrite; the so obtained diazo solution is poured into a solution of 187 parts of 1-amino-axy-ethoxy-naphthalene in 2,000 parts of icy water and 125 parts of hydrochloric acid of 19° Bé.; the mineral acidity is neutralized in proportion with the coupling.

When separated in the usual manner the dyestuff dyes cellulose acetate rayon silks in bright red. After diazotisation and development with 2-hydroxy-3-naphthoic acid, one obtains a bright green of good general fastnesses, very fast to light and stable to artificial light.

The 3-nitro-4-dimethyl-paraphenylenediamine used as starting material for the production of this dyestuff can be obtained in the following manner:

178 parts of 4-dimethylamino-1-acetanilide (melting at 130-131° C.) are dissolved in 720 parts of glacial acetic acid and 2,900 parts of water; one cools with ice to 0° and pours into the solution, in an hour, between 0 and +5°, 720 parts of a 50% solution of sodium nitrite. One stirs during one more hour; the nitrated derivative precipitates in totality; when separated by filtration it melts at 131° C. (The pure product obtained by re-crystallization from water melts at 132° C.) The so obtained 3-nitro-4-dimethylamino-1-acetanilide is treated during one hour at 95-100° C. with 500 parts of hydrochloric acid of 19° Bé. and 1500 parts of water. Thru neutralization with caustic soda until distinct alkalinity to phenolphthaleine, the base separates entirely in the form of oil. This base is extracted by means of an organic solvent such as benzene or ether and then the solvent is distilled.

Example 8

The aniline of Example 1 is substituted by 137 parts of paracresidine. The so obtained dyestuff dyes cellulose acetate rayon silks in orange red which, when diazotised and developed with 2-hydroxy-3-naphthoic acid gives a blue green of excellent fastness.

Example 9

The aniline of Example 1 is substituted by 138 parts of metanitraniline; a dyestuff is obtained which is similar to that of Example 8 as to shade and properties.

Example 10

3 parts of the dyestuff of Example 7 dispersed by means of an usual dispersing agent are impasted in 4,000 parts of water containing 12 parts of yellow soap. One heats to 40° C. and introduces 100 parts of cellulose acetate rayon silk yarns whereafter the temperature is raised up to 80-85° C. during half an hour. One dyes during one more hour at this temperature. The yarns are then thoroly rinsed and one diazotises the dyestuff on the fibre while manipulating it during one hour in the following bath maintained at 0°:

| | Parts |
|---|---|
| Water | 4,000 |
| Crystallized sodium nitrite | 8 |
| Hydrochloric acid of 19° Bé | 20 |

The yarns are thoroly wrung and rinsed with icy water and wrung once more. They are then introduced into a bath of 2-hydroxy-3-naphthoic acid prepared in the following manner:

4 parts of 2-hydroxy-3-naphthoic acid are dissolved by means of 1.33 parts of sodium carbonate in 200 parts of water; one completes to 4,000 parts with water at 30° C. and adds some drops of acetic acid at the moment of the development in order to obtain a bath which is distinctly acid to litmus paper.

When the yarns have been introduced, one heats at 85° C. during half an hour and maintains this temperature during half an hour; the yarns are then thoroly rinsed, wrung and dried.

What we claim is:

1. A green azo dyestuff of the general formula:

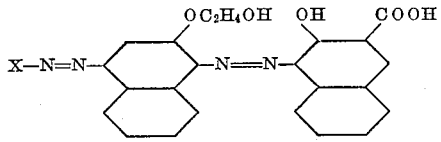

in which X represents the radical of a benzenic amine free from SO₃H or COOH groups, and from non-substituted amino groups.

2. A process of dyeing artificial silks basically composed of one of the members of the group consisting of the cellulosic esters and ethers, which comprises the steps of applying on the fibre an azodyestuff of the general formula:

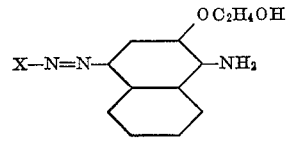

in which X represents the radical of a benzenic amine, free from SO₃H or COOH groups and from non-substituted amino groups, diazotizing said azodyestuff on the fibre and coupling with 2-hydroxy-3-naphthoic acid.

GEORGES KOPP.
RENÉ EUGÈNE MARCEL GANGNEUX.

REFERENCES CITED

The following references are of record in the file of this patent:

UNITED STATES PATENTS

| Number | Name | Date |
|---|---|---|
| 1,711,391 | Knecht | Apr. 30, 1929 |
| 1,935,657 | Mosby et al. | Nov. 21, 1933 |
| 2,183,998 | McNally et al. | Dec. 19, 1939 |
| 2,250,129 | Kopp et al. | July 22, 1941 |